(12) United States Patent
Ahrens

(10) Patent No.: US 8,505,293 B2
(45) Date of Patent: Aug. 13, 2013

(54) METHOD AND SYSTEM FOR CONVERTING KINETIC ENERGY CONTAINED IN HORIZONTAL FLOWS INTO USEFUL MECHANICAL ENERGY

(75) Inventor: Uwe Ahrens, Berlin (DE)

(73) Assignee: NTS Energie—und Transportsysteme GmbH, Berlin (DE)

( * ) Notice: Subject to any disclaimer, the term of this patent is extended or adjusted under 35 U.S.C. 154(b) by 388 days.

(21) Appl. No.: 12/809,166

(22) PCT Filed: Dec. 18, 2008

(86) PCT No.: PCT/EP2008/067956
§ 371 (c)(1),
(2), (4) Date: Jun. 18, 2010

(87) PCT Pub. No.: WO2009/083486
PCT Pub. Date: Jul. 9, 2009

(65) Prior Publication Data
US 2010/0307148 A1 Dec. 9, 2010

(30) Foreign Application Priority Data
Dec. 28, 2007 (EP) .................. 07150468

(51) Int. Cl.
*F03B 17/02* (2006.01)
*F03B 13/00* (2006.01)
*F03B 13/12* (2006.01)

(52) U.S. Cl.
USPC .................. 60/495; 290/43; 290/53

(58) Field of Classification Search
USPC ............ 244/153 R, 154; 290/43, 54, 53; 60/499, 495
See application file for complete search history.

(56) References Cited

U.S. PATENT DOCUMENTS

| | | | |
|---|---|---|---|
| 4,084,102 A * | 4/1978 | Fry et al. | 290/55 |
| 4,730,119 A | 3/1988 | Biscomb | 290/55 |

(Continued)

FOREIGN PATENT DOCUMENTS

| | | |
|---|---|---|
| DE | 19502948 | 7/1995 |
| EP | 0841480 | 5/1998 |
| EP | 06014634.7 | 1/2008 |
| NL | 1017171 | 7/2002 |

*Primary Examiner* — Thomas Denion
*Assistant Examiner* — Brian Inacay
(74) *Attorney, Agent, or Firm* — Roberts & Roberts, LLP

(57) ABSTRACT

An improved system for converting kinetic energy contained in naturally occurring horizontal flows occurring in fluids accumulated above ground into useful mechanical energy is specified in which at least one circulating element guided in a closed cycle, arranged substantially horizontal above the ground is provided, to which at least one buoyancy body having a crosssection of impact for the flow is attached by means of at least one guy rope or by means of a backstay chain, wherein in a section of the closed cycle, in which a propulsive power aligned in a direction of circulation acts on the buoyancy body via the flow impacting on the cross-section of impact, the distance between the circulating element and the buoyancy body is set greater than in a section of the closed cycle, in which via the flow impacting on the cross-section of impact no propulsive power aligned in the direction of circulation acts on the buoyancy body, further optimizing is carried out in that the buoyancy body is set during the cycle in its alignment to the flow such that with a flow acting transversely to the temporary direction of circulation of the circulating element it also experiences a force component acting in the direction of circulation and transfers to the circulating element via the at least one guy rope.

20 Claims, 5 Drawing Sheets

(56) References Cited

U.S. PATENT DOCUMENTS

| | | | |
|---|---|---|---|
| 6,072,245 A | 6/2000 | Ockels | 290/55 |
| 6,254,034 B1 * | 7/2001 | Carpenter | 244/153 R |
| 7,275,719 B2 * | 10/2007 | Olson | 244/155 A |
| 2003/0066934 A1 * | 4/2003 | Bolonkin | 244/153 R |
| 2007/0120004 A1 | 5/2007 | Olson | 244/10 |
| 2009/0285681 A1 | 11/2009 | Ahrens | 416/1 |

* cited by examiner

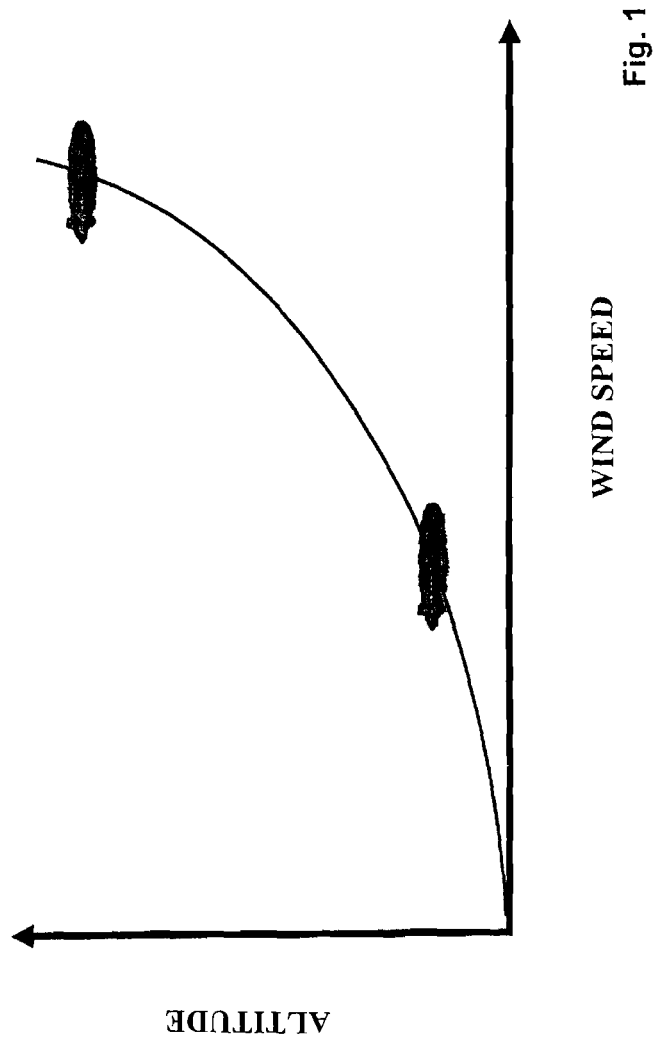

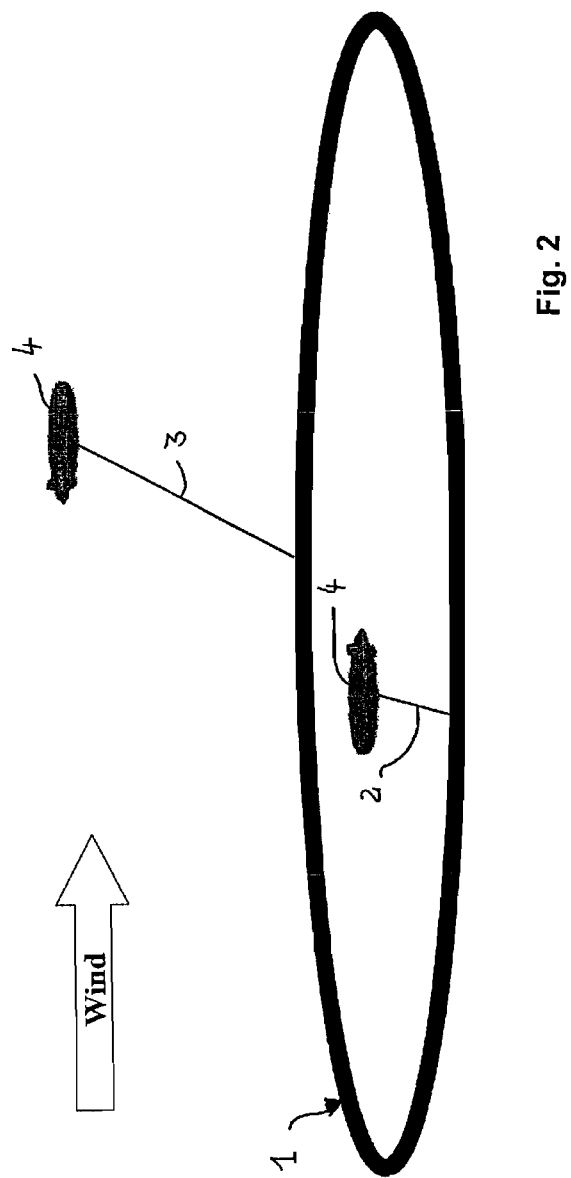

METHOD AND SYSTEM FOR CONVERTING KINETIC ENERGY CONTAINED IN HORIZONTAL FLOWS INTO USEFUL MECHANICAL ENERGY

FIELD OF THE INVENTION

The invention relates to a method and a system for converting kinetic energy, contained in horizontal flows occurring in naturally occurring horizontal flows fluids accumulated above ground, into useful mechanical energy.

PRIOR ART

Virtually all over the earth, in the fluids that essentially occur (the air contained in the atmosphere above the earth's surface, the fresh or salt water accumulated in bodies of water), there are naturally occurring horizontal flows. In terms of the present invention, these horizontal flows are understood to mean flows of the kind that in every case have a horizontal component. Examples of such flows are winds in the various strata of the atmosphere, ocean currents, or other flows in bodies of water. In principle, these flows are stores of large amounts of energy, the utilization of which is increasingly sought and has indeed already been achieved in the most various ways. Examples of the utilization of such flows that have already been achieved industrially are tidal power plants, which exploit the flow of masses of water that flow landward and out again with the flow and ebb of the tide to generate electricity via turbines and generators disposed on them, or wind farms, whose rotors, driven by the wind blowing over the land, first convert wind energy into mechanical energy and then, via generators connected to them, into electrical energy.

Principles of embodiment are also known in which for transportation by ship, kitelike flying bodies are connected to the ship via tether ropes and provide the propulsion of the ship by utilizing the power of the wind.

Making the energy in such flows useful has the advantage, over energy production form fossil fuels or the use of nuclear processes, of being substantially more environmentally friendly.

SUMMARY OF THE INVENTION

In European Patent Application 06 014 634.7, not yet published, a system is disclosed which employs buoyant bodies, which move at least in pairs in a circulation and which are shortened or lengthened in their spacing from the circulating element, depending on the alignment with the flow. With such a system, it is already possible for the amounts of energy contained in such flows to be utilized quite effectively. However, still further optimization in this respect can be achieved by increasing the angular range of the circulation within which the flow energy can be made useful.

This object is attained by the present invention. The invention is based on thoughts similar to the considerations in the aforementioned European Patent Application 06 014 634.7, not yet published. In principle, here as well, the fact that different flow speeds prevail in above-ground flows, depending on the altitude, is made use of. For instance, typically there are winds that vary regionally in their strength; in Europe, for example, they blow essentially and virtually continuously from the west, and they reach markedly higher wind speeds at higher altitudes than near the ground. This is made use of by providing that in the course of circulation, a buoyant body at the place where it can experience a positive propulsive force in a direction of circulation is moved to such distances from the circulation or the circulating element that it is exposed to powerful flow forces, or in other words, taking the wind as an example, where the buoyant body experiences high wind speeds. In regions of the circulation where "positive propulsion" of this kind cannot be achieved, the spacing of the buoyant body from the circulating element is adjusted such that the buoyant body gets into a horizontal stratum that has lower flow speeds.

Compared to the invention described and claimed in the aforementioned, as yet unpublished European Patent Application, however, the present invention makes a substantial change. In the earlier application the buoyant body is not described in detail, and if it is assumed to be purely an increased resistance rotor, then it can in fact be operated, and can produce energy, along only half the circulation, while in the invention it is now provided that the buoyant body is adjusted in terms of its alignment with the flow such that, even if the circulating element is traveling in a direction transverse to the flow, the buoyant body can still exert a propulsive force on the tether rope or tether chain in the travel direction of the circulating element. To that end, the buoyant body can be embodied on the order of a kite, for instance, but also in another way as a flying body with aerodynamically effective wings or a similar "active" design. Similarly to a sailboat, the buoyant body can even "tack" diagonally of a headwind and even in such situations can contribute to energy production. In this way, the angular range of the circulation that is usable for positive energy conversion, which for a purely increased resistance rotor is at most 180°, can be increased markedly, to angular ranges of up to about 270°. In the embodiment according to the present invention, unlike the construction known earlier, it is unnecessary for there to be two buoyant bodies each time. Instead, the distance along with the buoyant body must be guided, without producing energy, in the flow can instead must be overcome by expending energy, in that the buoyant body is pulled actively, for instance by electrical energy that is fed in, until it again reaches a region where because of the flow it can exert traction on the tether chain or tether rope and to that extend can produce positive energy.

Where the direction of the horizontal flows vary as a function of altitude, further optimization of the amount of mechanical energy converted can be achieved, it by adaptation to the various directions the buoyant body is moved to various altitudes during its circulation.

In principle, the variation of the spacing between the circulating element and the buoyant body can be done in the most various ways, but an attractive option is to use the tether rope or tether chain for the purpose. The tether rope or tether chain can be adjusted in its length by being wound up on a reel and by being paid out. The tether rope or tether chain can also be fixed to a circulating element at two points, which are movable farther away from one another, and between them can be guided relative to the buoyant body. By increasing the spacing of the two ends of the tethering element that are fixed to the circulating body, the buoyant body is pulled closer to the circulating element, while if that spacing is reduced, the distance from the buoyant body to the circulating element increases. By using a block and tackle, the effect can be increased still more, because if the two ends of the tether rope or tether chain move apart on the circulating element, a disproportionately pronounced shortening of the spacing is attained. This can be attained for example particularly by first stopping a securing part, which is to the rear in terms of the direction of circulation, for reeling in the buoyant body, while a forward part moves onward along with the circulating element. As a result, the kinetic energy, which exists in the system because of the flow present in the fluid, is utilized to reel in the buoyant body. By releasing the element that is rearward in terms of the direction of circulation, the spacing between the two ends of the tether rope or tether chain is shortened again, and the buoyant body glides upward. The force necessary for this is exerted by the buoyancy of the body itself To keep the expenditure of energy for guiding the buoyant body onward through such a region, in which no further forces pointing in the direction of circulation of the circulating element can be employed, as low as possible, it is advantageous if the cross section of impact of the buoyant body in such a region is minimized.

Although in principle a single buoyant body on a circulating element is sufficient for realization of the invention, it is naturally possible to achieve a greater amount of energy conversion with a plurality of buoyant bodies.

In addition, to prevent the buoyant body from tearing away in the system for securing the buoyant body, for instance in the event of wind gusts when the system is used in wind, it is possible to provide one or more coupling elements that have so-called slip couplings or other means for briefly intercepting a strong force.

The course of the closed circulation can be embodied in circular, oval, or any other arbitrary continuous form. Depending on the actually prevailing flow conditions, even essentially triangular or comparable courses can be selected.

In principle, the method and the system of the invention can be employed for conveying goods or persons for some distance along the circulation.

However, at present it is especially preferable for the system and the method to be employed for producing electrical energy. The method and the system have particular advantages then. Because of the capability of adjusting the speed of the circulating element along the closed circulation, it is possible, in relatively strong currents or flows, to reduce the force loading the tether ropes or tether chains by increasing the running speed. In addition, in producing electrical energy, the production of electric current can be adapted to the specific load in demand at the moment.

By the choice of buoyant bodies that are adjustable in their alignment relative to the flow direction, these bodies can optionally even be operated without a separate buoyant medium, such as a lighter-than-air gas, although this kind of buoyant medium can also be employed in the buoyant bodies provided according to the invention, which are adjustable in their alignment to the flow direction. Buoyant bodies without separate buoyant media have the advantage of being fundamentally lower-maintenance. Unlike gas-filled buoyant bodies, for example, in which the gas that provides buoyancy has to be replenished from time to time, such maintenance is dispensed with in buoyant bodies that do not have separate buoyant media.

In operation in wind, kitelike buoyant bodies, formed for instance without buoyant media, can first be pulled on by motor-driven operation of the system and thus brought to relatively high altitudes, before being caught there by a wind current. Thus the system, without active buoyancy elements, can be started even with there is virtually no flow in the vicinity of the ground or in the vicinity of the closed circulation. Also, if there is temporarily not enough flow speed (wind speed, for example) for circulation of the buoyant body that is free of a buoyant medium, a "dragging mode" that requires relatively little expenditure of energy, by pulling on the buoyant bodies using a motor, can keep the system in circulation and can keep the buoyant bodies at an altitude far from the ground. This is especially important since a break in the flow that keeps the buoyant body at its altitude would otherwise cause the buoyant body to lose altitude suddenly and be damaged by hitting the ground, for example, or to be contaminated by dirt or water (in operation over water), so that it can no longer be started again without further measures being taken.

Compared to conventional modern wind farms, which can require a speed of at least five meters per second to switch on, a system according to the invention can operate and produce energy at substantially lower wind speeds (of two meters per second and up).

By present calculations, it is assumed that in an embodiment for generating electric current using wind, the system of the invention can produce electric current approximately 90% of the time, since in the regions of interest, the required startup speed of two meters per second does as a rule prevail that often.

Although there has been especially strong emphasis on operating the system of the invention as a wind energy system, this is not the only form in which it can be used. Fundamentally, it is conceivable to employ this principle in other continuous flows as well, such as in ocean currents. Still other applications besides energy production are also possible within the scope of the invention, such as applications for transporting persons or goods.

BRIEF DESCRIPTION OF THE DRAWINGS

Further characteristics and advantage of the invention will become apparent from the ensuing description of an exemplary embodiment taken in conjunction with the accompanying drawings. In them:

FIG. 1 is a schematic graph that shows the ratio of the wind speed to the altitude above the ground;

FIG. 2 in a schematic illustration shows a system of a closed circulation which is fundamentally used in this invention as well, but with aerostatic buoyant bodies;

DESCRIPTION OF THE INVENTION

Figure 3A:
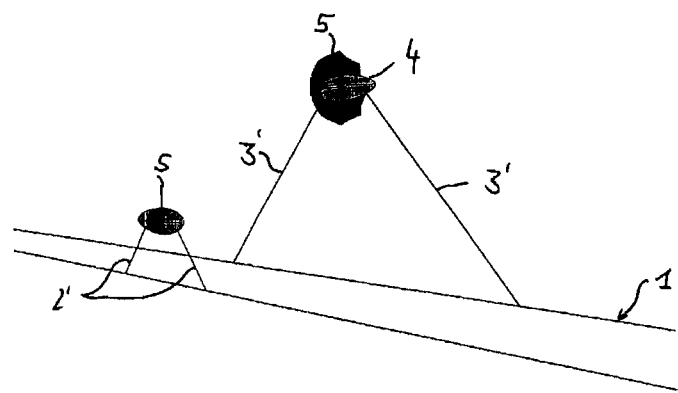
FIG. 3a is a further illustration with aerostatic buoyant bodies with a variable cross section of impact.

In the drawings, the invention is sketched schematically in terms of one possible exemplary embodiment and comparison with the system described in as yet unpublished European Patent Application 06 014 634.7.

In FIG. 1, it is first shown in terms of the wind how the wind speed increases with the distance from the ground, or in other words with the altitude. As examples of buoyant bodies here, aircraft are shown at various altitude levels to show clearly that they experience different wind speeds.

The principle illustrated in FIG. 1 is used by the invention for converting kinetic energy, contained in the wind (air flow), into useful mechanical energy.

A system for energy conversion of this kind, fundamentally already known from the aforementioned as yet unpublished European Patent Application on which the invention builds, is shown schematically in FIG. 2. As an essential component, the system includes at least one circulating element 1, guided in a closed circulation. This circulating element 1 may for instance be a circulating, closed rope or chain. The circulating element 1 may equally well be a carriage rolling on a rail. In the exemplary embodiment shown here, two buoyant bodies in the form of aircraft 4, are tethered by tether ropes 2 and 3 to the circulating element 1. These aircraft 4 are so-called aerostats, which can experience propulsion and can thus convert energy essentially only when there is a flow predominantly from behind.

The mode of operation of the system shown in FIG. 2 is based on the fact that at the greater altitude, the forces that forces act in the direction of the circulating element 1 on the aircraft 4 tethered by the longer tether rope 3 are greater than those acting in the opposite direction on the circulation of the aircraft 4 tethered by the shorter tether rope 2. At points where the direction of the circulating element 1 reverses relative to the wind direction, the lengths of the tether ropes 2 and 3 are changed in such a way that now the tether rope 2 has the greater length and the tether rope 3 is shortened, and so a net gain in energy can still be attained by way of the difference in the force experienced at the various altitudes.

This system can be still further improved by providing that, as shown in FIG. 3a, an additional sail 5 is disposed on the aircraft 4; when moving in the direction of the wind (in FIG. 3a, toward the left rear), the sail is unfurled, and when returning counter to the wind direction it is reeled up. To that extent, in addition to the force difference because of the altitude difference, there is also a further force difference from the different impact area or cross section of impact.

In FIG. 3a, a different construction of the tether ropes 2' and 3' is shown. Here, are two tether ropes are passed to the circulating element 1 and anchored there, or a tether rope is provided that is passed for instance through an eye on the aircraft 4 and is fastened by both free ends to the circulating element 1.

Figure 3B:
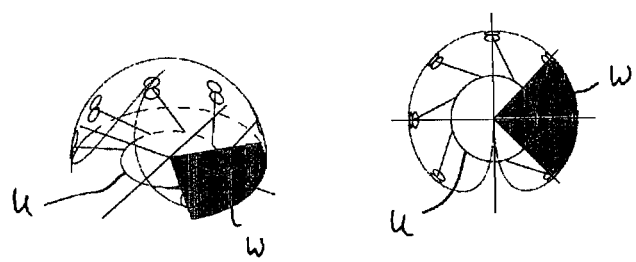
FIG. 3b schematically shows an angular range within which positive energy conversion can be achieved, given a circular circulation and a prevalent flow from one direction.

FIG. 3b schematically shows how along a circular circulation U, with an aerostatic flying body of this kind, which essentially makes energy conversion possible only with a strong tailwind, energy can be positively converted in fact only within a severely restricted angular range W (shaded in gray).

This is the point of departure for the invention in the actual sense.

To that end, instead of an aerostatic aircraft 4, a buoyant body operating on the aerodynamic principle, here in the form of a kite 6, is disposed on the end of each of the tether ropes 2 and 3. By suitable control provisions, such as control cables, this buoyant body can be positioned relative to the flow in such a way that even with a flow coming from the side or even a flow coming from diagonally in front, the buoyant body can still gain a force in the direction of circulation of the circulating element, for instance by "tacking". Compared to the embodiment shown in FIGS. 3a and 3b, the result is a correspondingly markedly increased effective range W, shaded in gray in FIG. 4b, along the circular circulation U.

A system equipped with a buoyant body operating on the aerodynamic principle does not fundamentally require a plurality of buoyant bodies; instead, it can function with only a single buoyant body disposed on an circulating element. Over the small range not shaded in gray, outside the effective range W, the buoyant body could be dragged away, for instance by expenditure of electrical energy or the like. Even so, it would still generate an excess of energy in further circulation over the large effective range W.

Figure 4A:
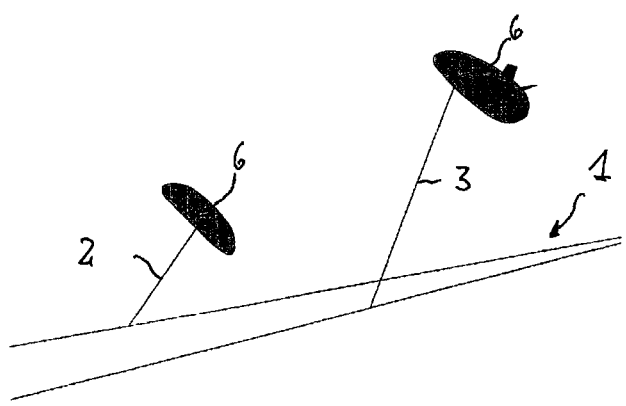
FIG. 4a schematically shows an illustration of a system of the invention with buoyant bodies operating on the aerodynamic principle.
Figure 4B:
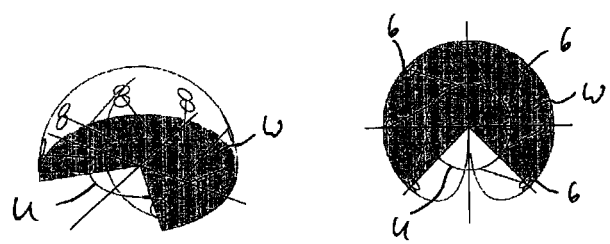
FIG. 4b schematically shows an angular range within which positive energy conversion can be attained with a flying body operating on the aerodynamic principle, given a circular circulation and a constant flow direction.

Naturally, the system becomes more efficient if, as indicated in FIG. 4b, a plurality of buoyant bodies in the form of kites 6 is distributed over the system and connected to either one common circulating element or separate circulating elements 1.

Figure 5:
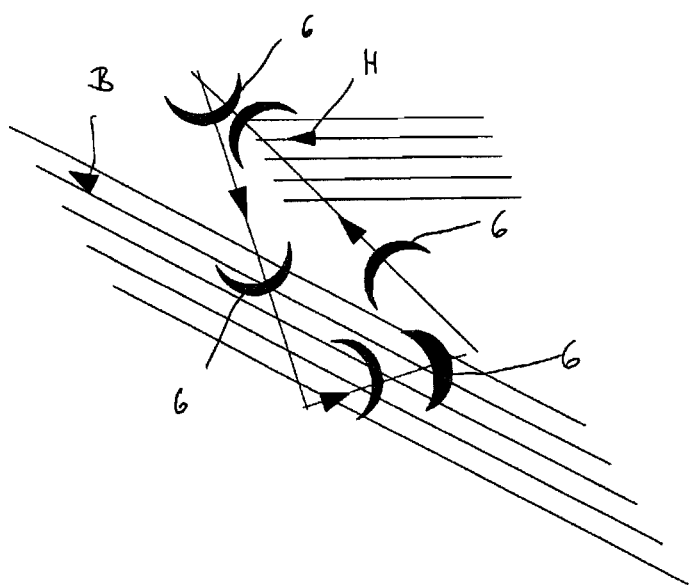
FIG. 5 schematically shows the utilization of various flow directions at different altitudes for further optimizing a system of the invention.

An additional increase in the effective range within which mechanical energy can be produced, with the aid of the buoyant body operating on the aerodynamic principle, is obtained in an optimized utilization at various altitudes and variously oriented flow conditions. That is, for instance with wind above land, different flow directions often prevail near the ground than farther away from the ground. This is shown in FIG. 5. The letter B indicates the wind direction near the ground, and H is the direction of the wind in a higher stratum. Depending on the wind directions B, H at the various altitudes and other given conditions of the terrain, if the system for utilizing wind energy is set up, it can for instance be used to optimize the shape of the closed circulation, in this example a triangular shape, but also to bring the buoyant bodies, in the form of kites 6 operating on the aerodynamic principle, to different altitudes. For instance, an buoyant body that at a higher altitude is positioned at an angle of only 30° to the wind, for instance, can be moved downward to lower strata, where it is then at an angle of 58° to the wind, for instance, and can thus continue generating propulsion in the direction of circulation of the circulating element 1.

By this kind of optimization measure, the effective range W along the circulation of a system of the invention can be improved still further.

From the above description of an exemplary embodiment, the advantages of the invention become especially clear once again. A system and method according to the invention can be used in particular for producing electrical energy from natural flows, such as constant winds, in an especially efficient and ecologically advantageous way. However, the use of the system of the invention is not limited to producing electrical energy. The system and method can also be used for transporting both goods and persons.

The exemplary embodiment is not intended to limit the invention, the subject of which is defined hereinafter in the claims.

The invention claimed is:

1. A method for converting kinetic energy contained in horizontal currents in naturally occurring horizontal flowing fluids accumulated above ground into useful mechanical energy, comprising: providing at least one circulating element, which circulating element is guided in a closed circulation course, and which circulating element and closed circulation course are arranged substantially horizontally above the ground, and to which circulating element at least one buoyant body having a cross section of impact is attached via at least one tether rope or tether chain; converting the kinetic energy of the horizontal current into mechanical energy via a circulation of the circulating element; adjusting the spacing between the circulating element and the buoyant body in a portion of the closed circulation course in which a propulsive force oriented in a direction of circulation acts on the buoyant body, such that the spacing between the circulating element and the buoyant body is greater than in a portion of the closed circulation course in which, via the current impacting on the cross section of impact, no propulsive force oriented in the direction of circulation acts on the buoyant body; and adjusting the buoyant body in its alignment with the current during the circulation such that, even with a current acting transversely to the instantaneous direction of circulation of the circulating element, it experiences a force component acting in the direction of circulation and transfers it to the circulating element via the at least one tether rope.

2. The method of claim 1, wherein further, for increasing the sector (W) of the circulation in which an energy conversion into mechanical energy can take place, the at least one buoyant body is moved to different vertical positions.

3. The method of claim 1 wherein for varying the spacing of the buoyant body from the circulating element, the tether rope or tether chain is adjusted.

4. The method of claim 1 wherein the cross section of impact of the buoyant body is minimized in the portion of the closed circulation course in which no propulsive force oriented in the direction of circulation acts on the buoyant body via the current impacting on the cross section of impact.

5. The method of claim 1 wherein a plurality of buoyant bodies are used which are fixed in spaced-apart fashion on one common circulating element or on a plurality of circulating elements, movable in the closed circulation course , and which are adjustable individually with regard to the spacing from the circulating element and in their alignment with the current.

6. A system for converting kinetic energy contained in horizontal currents of naturally occurring horizontal flowing fluids accumulated above ground into useful mechanical energy, comprising: at least one circulating element guided in a closed circulation course, which circulating element and closed circulation course are arranged substantially horizontally above the ground, to which circulating element at least one buoyant body is fixed via at least one tether rope or tether chain; a device for adjusting the spacing between the buoyant body and the circulating element as a function of a location of the buoyant body relative to the current; and an adjusting device for adjusting the alignment of the buoyant body relative to the current, which system is capable of converting the kinetic energy of the horizontal current into mechanical energy via a circulation of the circulating element.

7. The system of claim 6, wherein for changing the spacing of the buoyant body from the circulating element, the tether ropes or tether chains are adjustable.

8. The system of claim 6 wherein the buoyant body has a variable cross section of impact.

9. The system of claim 6 wherein a plurality of buoyant bodies spaced apart from one another and fixed to one or more circulating elements are provided.

10. The method of claim 1 wherein for varying the spacing of the buoyant body from the circulating element, the tether rope or tether chain is adjusted.

11. The method of claim 2 wherein the cross section of impact of the buoyant body is minimized in the portion of the closed circulation course in which no propulsive force oriented in the direction of circulation acts on the buoyant body via the current impacting on the cross section of impact.

12. The method of claim 3 wherein the cross section of impact of the buoyant body is minimized in the portion of the closed circulation course in which no propulsive force oriented in the direction of circulation acts on the buoyant body via the current impacting on the cross section of impact.

13. The method of claim 10 wherein the cross section of impact of the buoyant body is minimized in the portion of the closed circulation course in which no propulsive force oriented in the direction of circulation acts on the buoyant body via the current impacting on the cross section of impact.

14. The method of claim 2 wherein a plurality of buoyant bodies are used which are fixed in spaced-apart fashion on one common circulating element or on a plurality of circulating elements movable in the closed circulation course , and which are adjustable individually with regard to the spacing from the circulating element and in their alignment with the current.

15. The method of claim 3 wherein a plurality of buoyant bodies are used which are fixed in spaced-apart fashion on one common circulating element or on a plurality of circulating elements movable in the closed circulation course , and which are adjustable individually with regard to the spacing from the circulating element and in their alignment with the current.

16. The method of claim 10 wherein a plurality of buoyant bodies are used which are fixed in spaced-apart fashion on one common circulating element or on a plurality of circulating elements movable in the closed circulation course , and which are adjustable individually with regard to the spacing from the circulating element and in their alignment with the current.

17. The method of claim 4 wherein a plurality of buoyant bodies are used which are fixed in spaced-apart fashion on one common circulating element or on a plurality of circulating elements movable in the closed circulation course , and which are adjustable individually with regard to the spacing from the circulating element and in their alignment with the current.

18. The method of claim 11 wherein a plurality of buoyant bodies are used which are fixed in spaced-apart fashion on one common circulating element or on a plurality of circulating elements movable in the closed circulation course , and which are adjustable individually with regard to the spacing from the circulating element and in their alignment with the current.

19. The method of claim 12 wherein a plurality of buoyant bodies are used which are fixed in spaced-apart fashion on one common circulating element or on a plurality of circulating elements movable in the closed circulation course , and which are adjustable individually with regard to the spacing from the circulating element and in their alignment with the current.

20. The method of claim 13 wherein a plurality of buoyant bodies are used which are fixed in spaced-apart fashion on one common circulating element or on a plurality of circulating elements movable in the closed circulation course , and which are adjustable individually with regard to the spacing from the circulating element and in their alignment with the current.

* * * * *